United States Patent [19]

Winkler

[11] 3,998,709
[45] Dec. 21, 1976

[54] TREATING REMAINS CONTAINING SODIUM CHLORIDE AND SODIUM SULPHATE

[75] Inventor: Robert Winkler, Wallisellen, Switzerland

[73] Assignee: Escher Wyss Limited, Zurich, Switzerland

[22] Filed: Sept. 19, 1975

[21] Appl. No.: 615,187

[30] Foreign Application Priority Data

Sept. 26, 1974 Switzerland .................... 13029/74

[52] U.S. Cl. ................................ 204/98; 204/128; 210/65; 210/66; 210/67; 210/73 R
[51] Int. Cl.² ..................... C25B 1/16; C25B 1/26; B01D 1/00
[58] Field of Search ............. 210/65, 66, 67, 73 R; 204/98, 128

[56] References Cited
UNITED STATES PATENTS 2,863,809   12/1958   Svanoe ................................ 204/98
3,017,245   1/1962   Goodenough ........................ 23/89

OTHER PUBLICATIONS
Handbook of Chem. & Physics, pp. 568–569, 574–575.

Primary Examiner—R. L. Andrews
Attorney, Agent, or Firm—Robert A. Ostmann

[57] ABSTRACT

Method of dissolving out a sodium sulphate component of a residual product obtained upon evaporation and cooling of a sodium hydroxide solution originating from a diaphragm electrolysis, the product occuring in form of a crystallized salt mixture containing sodium chloride and sodium sulphate. First of all residues of the sodium hydroxide are removed from the product. Thereafter the mixture of sodium chloride and sodium sulphate is so slurried in water and treated that a maximum of the sodium chloride and a first part of the sodium sulphate are dissolved up to a solution being saturated of said two components while a second part of the sodium sulphate and a possible rest of the sodium chloride remain suspended. Whereafter the suspended solid substance is then separated from the sodium chloride-sodium sulphate mother brine.

15 Claims, 1 Drawing Figure

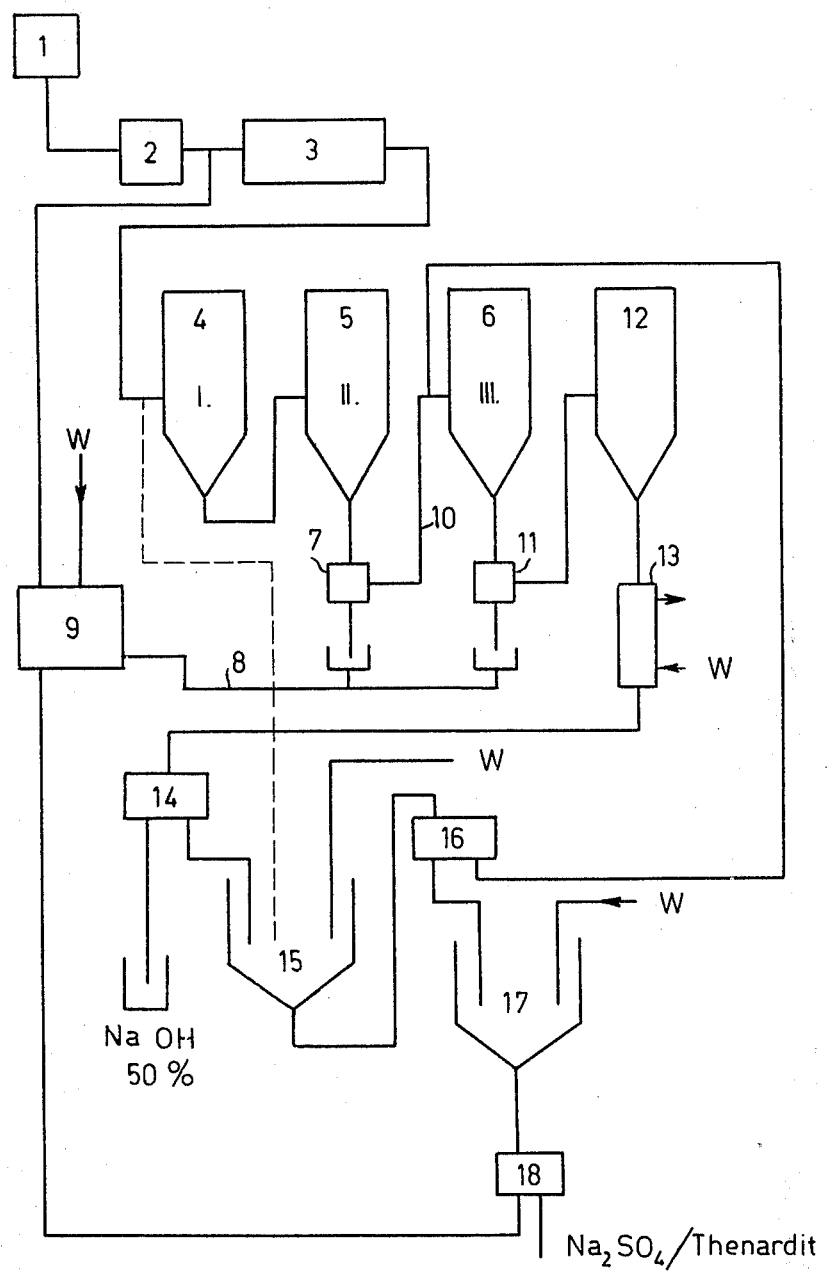

TREATING REMAINS CONTAINING SODIUM CHLORIDE AND SODIUM SULPHATE

BACKGROUND OF THE INVENTION

The invention relates to a process for treating a residual product which contains sodium chloride and sodium sulphate and which occurs in the form of a crystallised salt mixture upon evaporation and cooling of a sodium hydroxide solution obtained from a diaphragm electrolysis.

Known processes for the treatment of a residual product of the type described provide for dissolving out the sodium sulphate by slurring the residual product in water or in a sodium chloride brine with a low sulphate content, preferably at a temperature of the slurry at which a maximum of sodium sulphate and a minimum of sodium chloride become dissolved. Thereafter, the sodium chloride which has remained undissolved in the slurry is removed by centrifuging. The separated mother brine can be recovered if the sodium sulphate is precipitated as decahydrate (Glauber salt) by cooling to about 0° C, or if a precipitation of calcium sulphate is caused by addition of calcium chloride.

A relatively expensive equipment is necessary for these known processes, and in addition the cost for energy is considerable, especially in those cases where the proportion of sodium sulphate to be separated out is relatively small. The, as a secondary product obtained sodium sulphate is in the form of the difficult depositable Glauber salt.

SUMMARY OF THE INVENTION

It is the object of the invention to find a process for the treatment of a residual product containing sodium chloride and sodium sulphate, which process, by comparison with the prior known process, needs a more simple equipment and with which the energy consumption is lower, and the separated sodium sulphate is obtained as a secondary product which can be deposited without difficulty.

This object is achieved according to the invention in connection with the process initially referred to by the fact that first of all residues of the sodium hydroxide solution are removed from the residual product in a preliminary stage and thereafter the mixture of sodium chloride and sodium sulphate is so slurried in water that a maximum of the sodium chloride and a first part of the sodium sulphate are dissolved up to the point of saturation of the two components while a second part of the sodium sulphate, and a possible rest of the sodium chloride, remain suspended as a solid substance, whereafter the solid substance is then separated from the mother brine comprising sodium chloride and sodium sulphate.

After separating out the solid substance, the sodium chloride-sodium sulphate mother brine is advantageously supplied into the electrolysis stage and/or into the evaporisation stage.

It is important in this respect that the part of the dissolved sodium sulphate in the mother brine is only maintained at such a high level that, with the supply thereof into the electrolyte of the electrolysis, the permissible quantity of sodium sulphate in the electrolyte is not exceeded.

This can advantageously be achieved by the fact that the proportion of the sodium sulphate which is to be separated out or of the sodium sulphate dissolved in the mother brine is regulated by measured quantities of a corresponding proportion of water during the slurring procedure.

A regulation of the proportion to be separated out is also advantageously carried out by the slurring being undertaken at elevated temperature, at which the solubility of the sodium chloride is high, and the solubility of the sodium sulphate is at the same time minimal, advantageously at a temperature between 60° and 120° C.

In the preliminary stage, the residues of the sodium hydroxide solution are advantageously removed by dilution of the residual product and subsequent separation of the diluted sodium hydroxide solution from the crystallised salt mixture consisting of sodium chloride and sodium sulphate.

Water can be used for dilution purposes. However, for the dilution in the preliminary stage, it is more advantageous to use a diluted sodium hydroxide solution, since it is provided for the separated, diluted sodium hydroxide solution to return into the evaporation stage. Accordingly, for the dilution in the preliminary stage, it is advantageous as regards energy consumption to use a part of the caustic cell solution originating from the diaphragm electrolysis.

With this process, the separated sodium sulphate is recovered as a solid substance, and in fact as thenardite and not, as hitherto, as a decahydrate, i.e. Glauber's salt, which can only be deposited with difficulty.

As an additional advantage of the process according to the invention, it is also possible to mention the direct recovery of the sodium chloride as a brine, which is returned without any additional processing into the diaphragm electrolysis.

BRIEF DESCRIPTION OF THE DRAWING

The invention is hereinafter more fully described and explained by reference to a drawing, which represents diagrammatically an installation for the evaporation of caustic soda solution with an installation given by way of example for carrying out the process according to the invention.

DESCRIPTION OF THE PREFERRED EMBODIMENTS

A brine is supplied into a purifying system 2 from a sodium chloride borehole 1, and in this cleaning system the brine is freed from a proportion of calcium and magnesium. A pure brine which is obtained by the treatment still contains a proportion of sodium sulphate. The pure brine is admixed with a brine which is prepared from a sodium chloride which has been recovered from evaporation stages of the installation, as hereinafter explained. This brine mixture is supplied as electrolyte to a diaphragm electrolysis arrangement 3.

The proportion of sodium sulphate in the electrolyte should usually be in the range up to 0.6%.

In this example as illustrated, a caustic cell solution coming from the diaphragm electrolysis 3 contains 10% of sodium hydroxide solution, 17% of sodium chloride and 0.5% of sodium sulphate, and a residue of water. The solution is introduced into three stages 4, 5 and 6 of an evaporation installation (stages I, II and III). In these stages, the sodium chloride crystallises, the latter being separated from the solution by means of separation arrangements 7 and 11 and being returned through a pipe 8 and a preparation tank 9 into the electrolysis 3.

In a following expansion device 12 and a subsequent condenser 13, the residue (about 15%) of the sodium chloride capable of being precipitated and also the large proportion of the sodium sulphate is crystallised out. By means of a separation device 14, the now 50% sodium hydroxide solution is separated out and collected as product.

It is starting from this separation arrangement 14 that there is shown and described an installation according to the invention for carrying out the treatment of the residual product, which remains after the separation of the sodium hydroxide solution in the separating arrangement 14.

As well as the proportion of sodium chlorids and sodium sulphate, the residual product still contains residues of up to 20% of sodium hydroxide solution, which residues are undesirable for again using the residual product in the diaphragm electrolysis.

Consequently, the mixture is conveyed to an arrangement 15 for dissolving out the residues of the sodium hydroxide solution, in which arrangement they are diluted by addition of water at a temperature between 60° and 100° C and conveyed to the separating arrangement 16, in which the diluted, e.g. 25%, sodium hydroxide solution is separated out and is conveyed back for evaporation purposes into the third (III) stage 6 of the evaporation installation.

The added water has to be evaporated out in the said stage. Consequently, it is more advantageous to use a diluted sodium hydroxide solution in the arrangement 15 for dilution purpose, namely, a part of the 10% sodium hydroxide solution coming from the diaphragm electrolysis 3 as a caustic cell solution, as is illustrated inthe drawing by means of a broken line. As a result, no additional water has to be removed by evaporation.

It would also be possible for the residues of the sodium hydroxide solution to be removed in a preliminary stage by neutralisation by means of hydrochloric acid. However, such a procedure, which is known per se, does not require more detailed description.

A salt mixture which is separated out after the separating arrangement 16 contains mainly sodium chloride and sodium sulphate. This salt mixture is conveyed to a slurrying device 17, where water is added and a slurry of the salts is prepared. A temperature is set at this stage, which offers a maximum solubility for the sodium chloride and a restricted or minimal solubility for the sodium sulphate (for example, at 80° C). In this manner, a maximum of the sodium chloride and a first part of the sodium sulpate enters into saturated solution. A second part of the sodium sulphate, namely, the residue of the sodium sulphate and possibly a rest of the sodium chloride from the salt mixture after the separation arrangement 16, then remain undissolved, as suspended solids, in suspension.

The solution and the suspension are supplied to a separation arrangement 18, where the suspended solid substance is separated out and is available in a form which can be, without difficulty, deposited, namely, as thenardite with a possible minimal proportion of sodium chloride.

The thenardite can be further refined, for example, by washing out.

The part of the sodium sulphate which is separated out must correspond in the total balance of the installation for recovering the sodium hydroxide solution to the quantity of the sulphate which was feshly supplied to the installation, after the purification of the brine originating from a borehole, with the pure brine to the electrolysis or to the electrolyte.

The mother brine from the separation arrangement 18, in which is contained, as well as the sodium chloride, also that proportion of sodium sulphate not separated out and permissible for the total balance of the complete installation for the recovery of sodium hydroxide solution, i.e. the first dissolved part, which passed over into the solution in the deposition arrangement, is fed back to the electrolyte by way of the preparation tank 9.

A proportion of sodium sulphate is therefore allowed to remain in the circulation, since thereby the said permitted proportion of up to 0.6% of sodium sulphate in the electrolyte is not exceeded.

It would also be possible for the sodium chloride-sodium sulphate mother brine, after the separation arrangement 18, or possibly only a part of this brine, to be returned into the evaporation stage, for example, into that stage III of the evaporation installation which is indicated by 6. For this purpose, a pipe would have to lead from the separation arrangement 18 to stage III of the evaporation installation.

If necessary, a larger quantity of sodium sulphate could be separated out from the circulation, and in this case also a larger proportion of sodium chloride would be separated out with the thenardite. The quantity of water supplied for the slurring in the arrangement 17 would in this case have to be correspondingly reduced.

I claim:

1. In a process for treating sodium chloride brine containing sodium sulphate wherein the brine is subjected to diaphragm electrolysis to produce caustic cell solution, said caustic cell solution is then subjected to evaporation and cooling stages to increase the concentration of sodium hydroxide and crystallize sodium chloride and sodium sulphate, and the caustic solution of higher concentration is then separated from the crystallized salts to leave a residual product comprising a mixture of crystallized sodium chloride and sodium sulphate with a residue of the sodium hydroxide solution, the improvement which comprises
    a. removing from the residual product the sodium hydroxide solution to thereby provide a preliminary mixture of sodium chloride and sodium sulphate;
    b. slurrying said preliminary mixture with water to produce a mother brine saturated with respect to both sodium chloride and sodium sulphate, the slurrying conditions being such that at least a major portion of the sodium chloride and a first part of the sodium sulphate in said preliminary mixture are dissolved while a second part of the sodium sulphate and any remaining sodium chloride remain as suspended solids;
    c. separating the suspended solids from said mother brine; and
    d. feeding back to a process stage preceding cooling at least some of said mother brine from which the suspended solids have been separated.

2. A process as defined in claim 1 in which said removal of sodium hydroxide from the residual product includes the step of diluting that product to form a dilute sodium hydroxide solution containing a mixture of crystallized sodium chloride and sodium sulphate; and the step of separating the dilute sodium hydroxide solution from the crystallized salt mixture.

3. A process as defined in claim 2 in which the residual product is diluted with water.

4. A process as defined in claim 3 in which dilution is effected at a temperature between 60° and 100°C.

5. A process as defined in claim 2 in which the residual product is diluted with a dilute sodium hydroxide solution.

6. A process as defined in claim 5 in which the sodium hydroxide solution used to dilute the residual product is obtained from the output of the electrolysis stage.

7. A process as defined in claim 2 including the step of returning said separated dilute sodium hydroxide solution to the evaporation stage.

8. A process as defined in claim 1 in which said slurrying is effected at an elevated temperature at which the solubility of sodium chloride is high and the solubility of sodium sulphate is low.

9. A process as defined in claim 8 in which said temperature is between 60° and 120° C.

10. A process as defined in claim 1 in which said mother brine which is fed back to a process stage preceding cooling is introduced at the electrolysis stage; and in which the quantity of sodium sulphate dissolved in the mother brine is regulated so that feeding back of mother brine to the electrolysis stage does not cause the sodium sulphate content of the electrolyte to exceed a limit of 0.6%.

11. A process as defined in claim 10 in which some of said mother brine which is fed back is introduced at the electrolysis stage, and some is introduced at an evaporation stage.

12. A process as defined claim 1 in which the ratio of said first and second parts of sodium sulphate is regulated by controlling the amount of water used in the slurrying step.

13. A process as defined in claim 1 in which said removal of sodium hydroxide from the residual product includes neutralization by means of hydrochloric acid.

14. A process as defined in claim 1 including the step of washing the solids separated from the mother brine to obtain sodium chloride and sodium sulphate separated from each other.

15. A process as defined in claim 1 in which said mother brine which is fed back to a process stage preceding cooling is introduced at an evaporation stage.

* * * * *